(12) United States Patent
Nakamura

(10) Patent No.: US 12,479,239 B2
(45) Date of Patent: Nov. 25, 2025

(54) CASTER

(71) Applicant: NAKAMURA CO. LTD., Tokyo (JP)

(72) Inventor: Akira Nakamura, Tokyo (JP)

(73) Assignee: NAKAMURA CO. LTD., Tokyo (JP)

( * ) Notice: Subject to any disclaimer, the term of this patent is extended or adjusted under 35 U.S.C. 154(b) by 36 days.

(21) Appl. No.: 18/689,491

(22) PCT Filed: Sep. 2, 2022

(86) PCT No.: PCT/JP2022/033174
§ 371 (c)(1),
(2) Date: Mar. 6, 2024

(87) PCT Pub. No.: WO2023/037987
PCT Pub. Date: Mar. 16, 2023

(65) Prior Publication Data
US 2024/0359505 A1    Oct. 31, 2024

(30) Foreign Application Priority Data

Sep. 9, 2021  (JP) ................................ 2021-146997

(51) Int. Cl.
*B60B 33/00* (2006.01)
(52) U.S. Cl.
CPC ...... *B60B 33/0068* (2013.01); *B60B 33/0049* (2013.01); *B60B 33/0057* (2013.01); *B60B 2900/114* (2013.01)
(58) Field of Classification Search
CPC ........... A45C 5/143; A45C 5/14; A45C 5/141; A45C 5/145; A45C 5/142; A45C 2005/142; B60B 33/00; B60B 33/0002; B60B 33/0005; B60B 33/001; B60B 33/0015; B60B 33/0013; B60B 33/08; B60B 33/0039; B60B 33/0042; B60B 33/0049; B60B 33/0057; B60B 33/006; B60B 33/0068; B60B 19/12; B60B 2200/45; B60B 2360/32; B60B 2360/324;
(Continued)

(56) References Cited

U.S. PATENT DOCUMENTS 4,125,183 A * 11/1978 Lang ...................... B65G 39/12
16/46
5,412,838 A    5/1995 Yang
(Continued)

FOREIGN PATENT DOCUMENTS

JP    2003-072307 A    3/2003
JP    2003-112501 A    4/2003
(Continued)

OTHER PUBLICATIONS

Nov. 29, 2022 International Search Report issued in International Patent Application No. PCT/JP2022/033174.
(Continued)

*Primary Examiner* — Chuck Y Mah
(74) *Attorney, Agent, or Firm* — Oliff PLC

(57) ABSTRACT

A caster whose overall height can be reduced. A caster includes a wheel, a wheel support portion having a plate shape provided with an opening where the wheel is disposed and rotatably supporting the wheel, and a swivel mechanism portion that holds an outer peripheral portion of the opening in the wheel support portion in a horizontally swivelable manner.

6 Claims, 8 Drawing Sheets

(58) Field of Classification Search
CPC ......... B60B 2900/114; B60B 2900/121; B60B 2900/212; B60B 2900/321; B60B 16/21; B60B 16/26; B62B 5/0083; B62B 2301/252

See application file for complete search history.

(56) References Cited

U.S. PATENT DOCUMENTS

| | | | |
|---|---|---|---|
| 6,223,388 B1* | 5/2001 | Sey | B60B 33/0039 16/46 |
| 6,244,417 B1* | 6/2001 | Timmer | B65G 39/025 193/35 MD |
| 6,728,991 B2* | 5/2004 | Lai | B60B 33/0039 16/35 R |
| 6,854,159 B2* | 2/2005 | Ruitenbeek | B60B 33/0073 16/42 R |
| 8,739,364 B2* | 6/2014 | Fromm | B60B 33/006 16/42 R |
| 11,235,617 B1* | 2/2022 | Rabi | B60B 33/0044 |
| 2017/0043621 A1* | 2/2017 | Mangano | B60B 33/0039 |
| 2019/0009164 A1* | 1/2019 | Russell-Uren | B60B 33/0073 |

FOREIGN PATENT DOCUMENTS

| | | |
|---|---|---|
| JP | 3127621 U | 12/2006 |
| JP | 2011-218141 A | 11/2011 |
| JP | 2015-009640 A | 1/2015 |

OTHER PUBLICATIONS

Mar. 22, 2023 Office Action issued in Japanese Patent Application No. 2021-146997.

Nov. 29, 2022 Written Opinion issued in International Patent Application No. PCT/JP2022/033174.

* cited by examiner

[FIG 1]
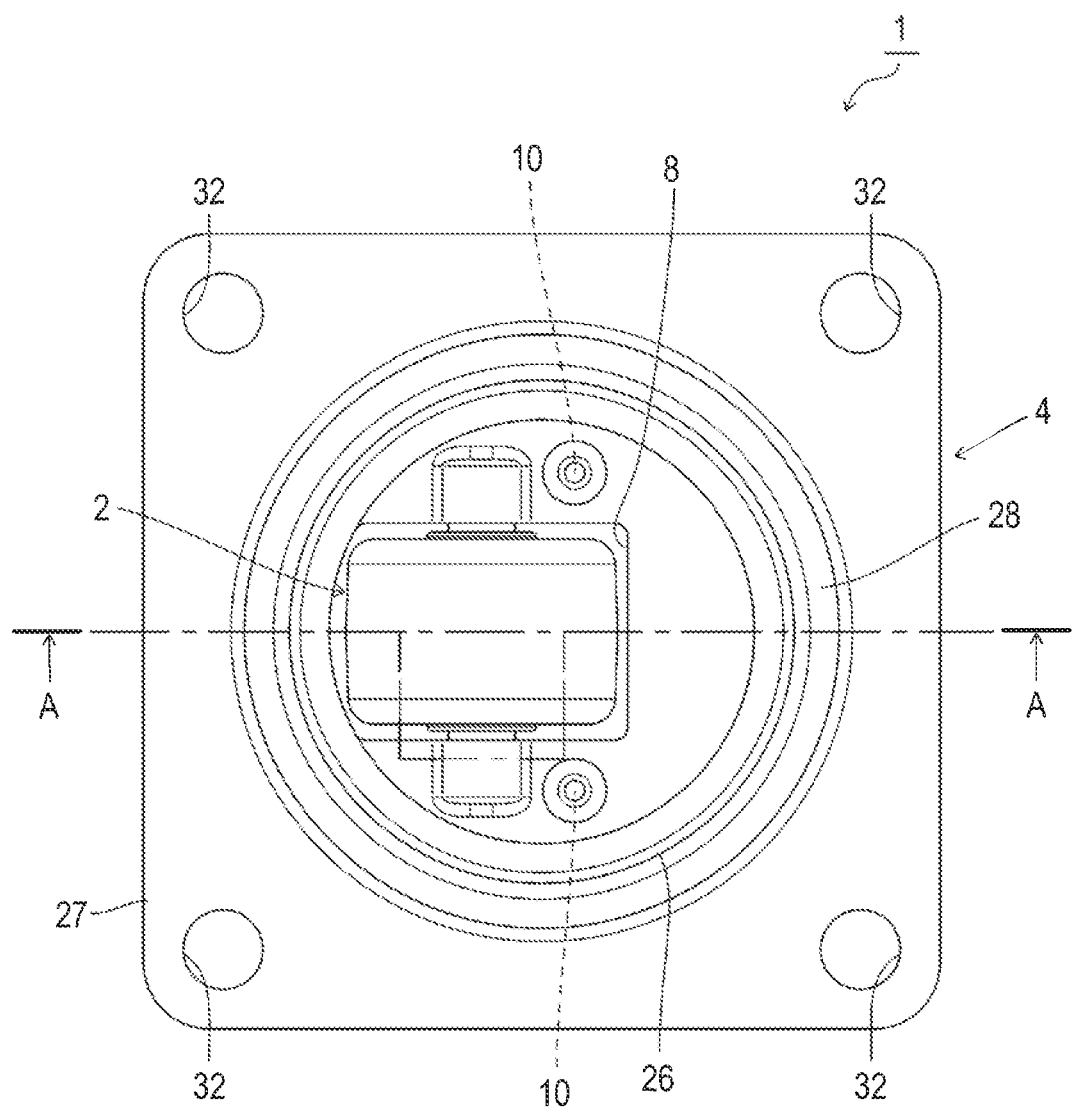

[FIG 2]
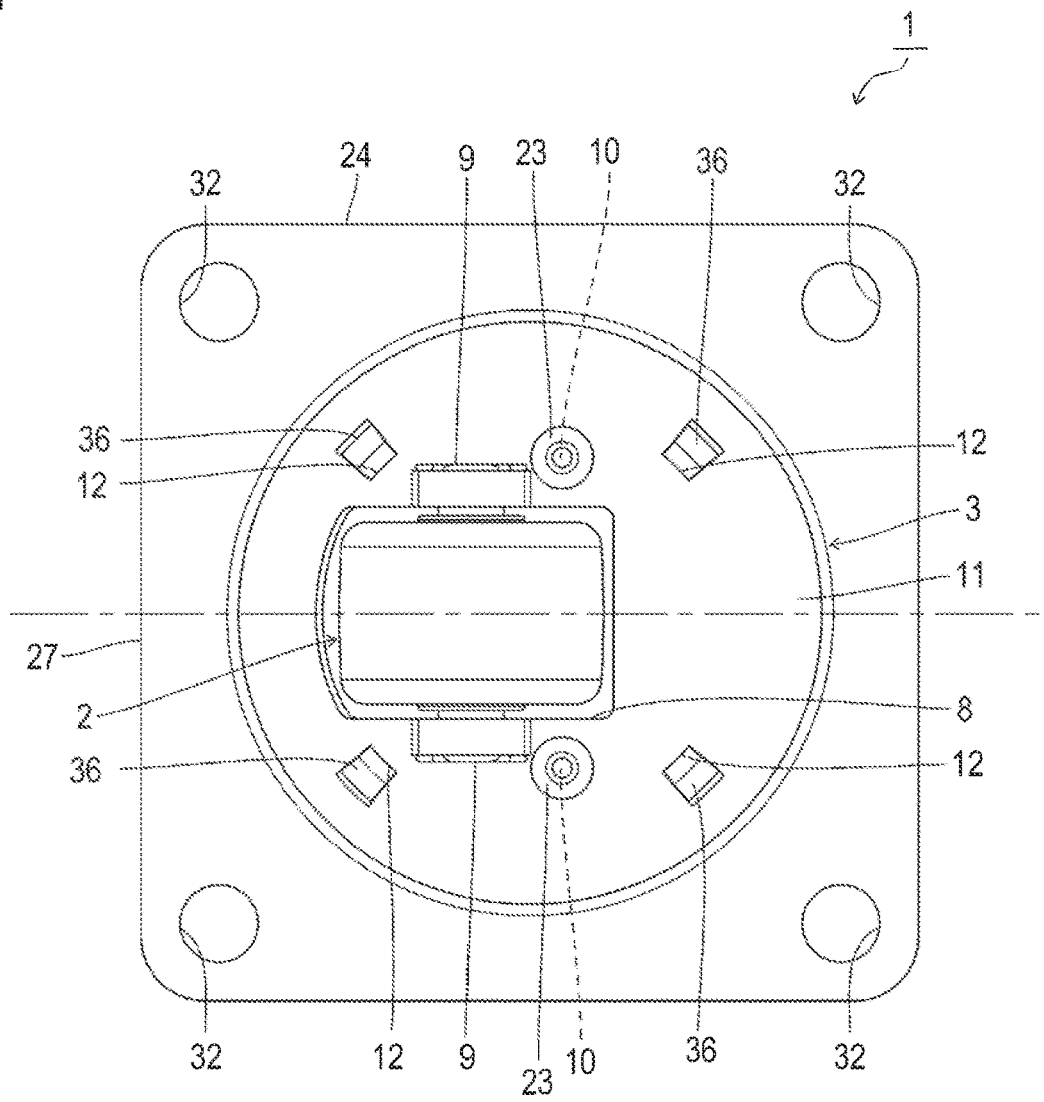
[FIG 3]
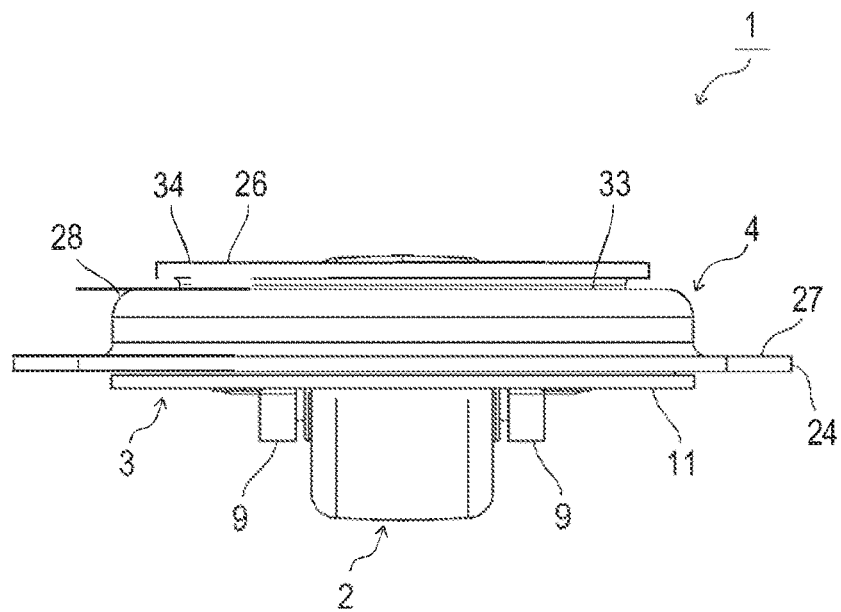

[FIG 4]
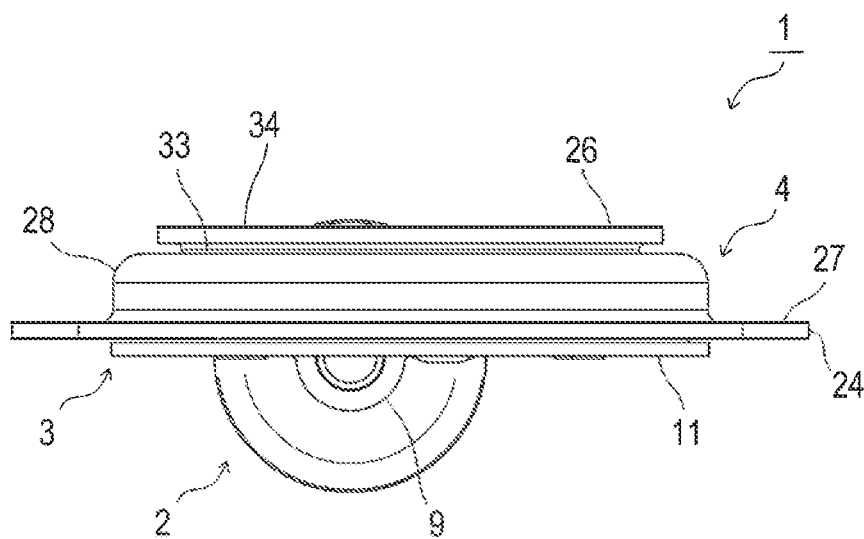
[FIG 5]
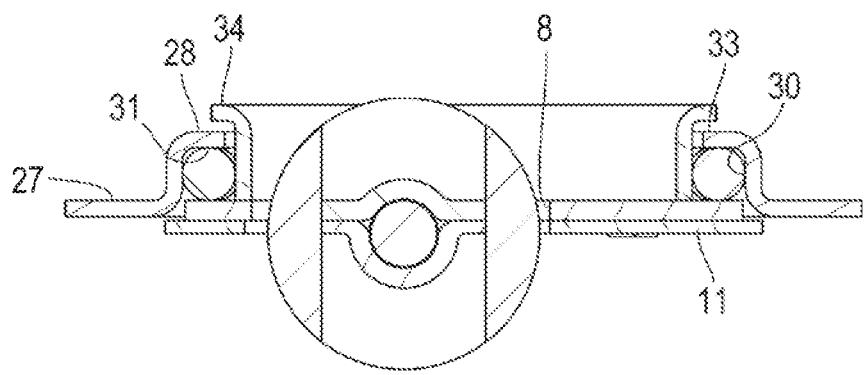
A-A

[FIG 6]
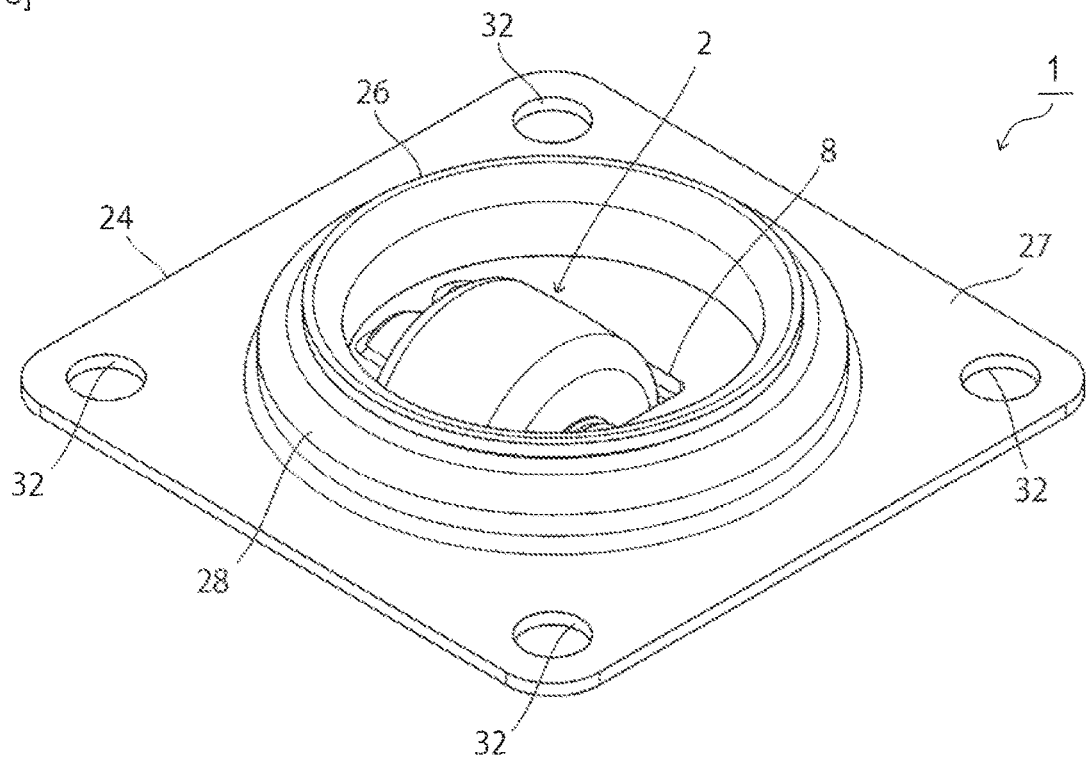
[FIG 7]
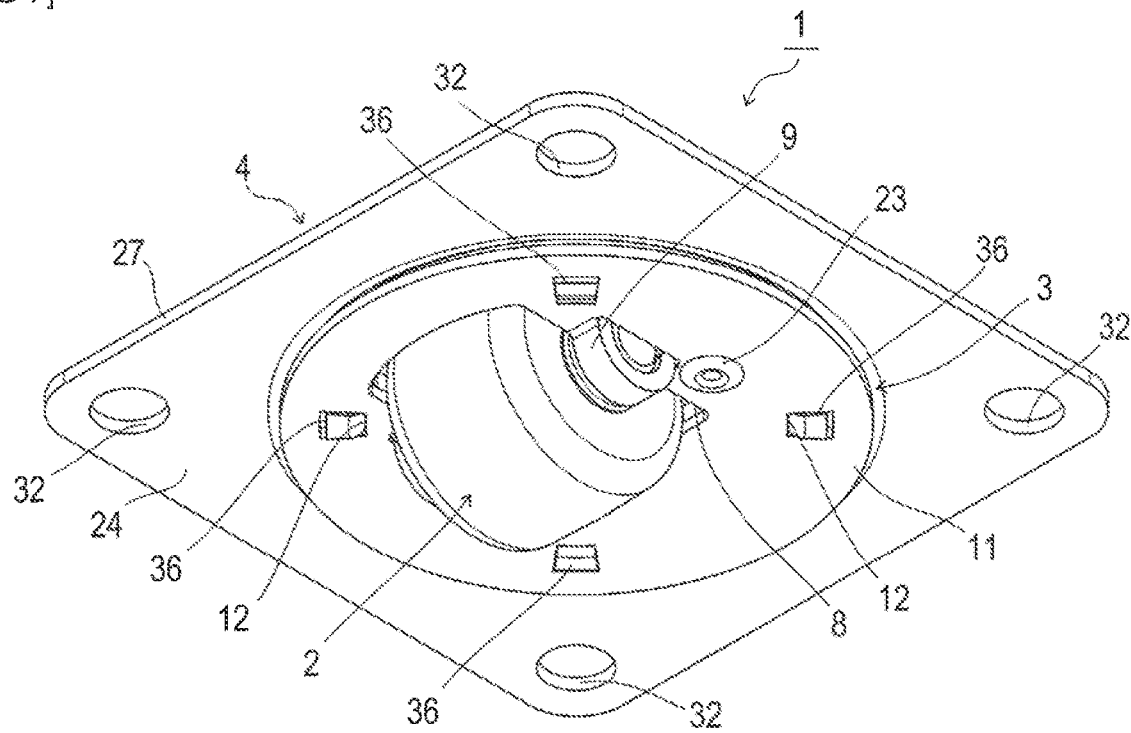

[FIG 8]
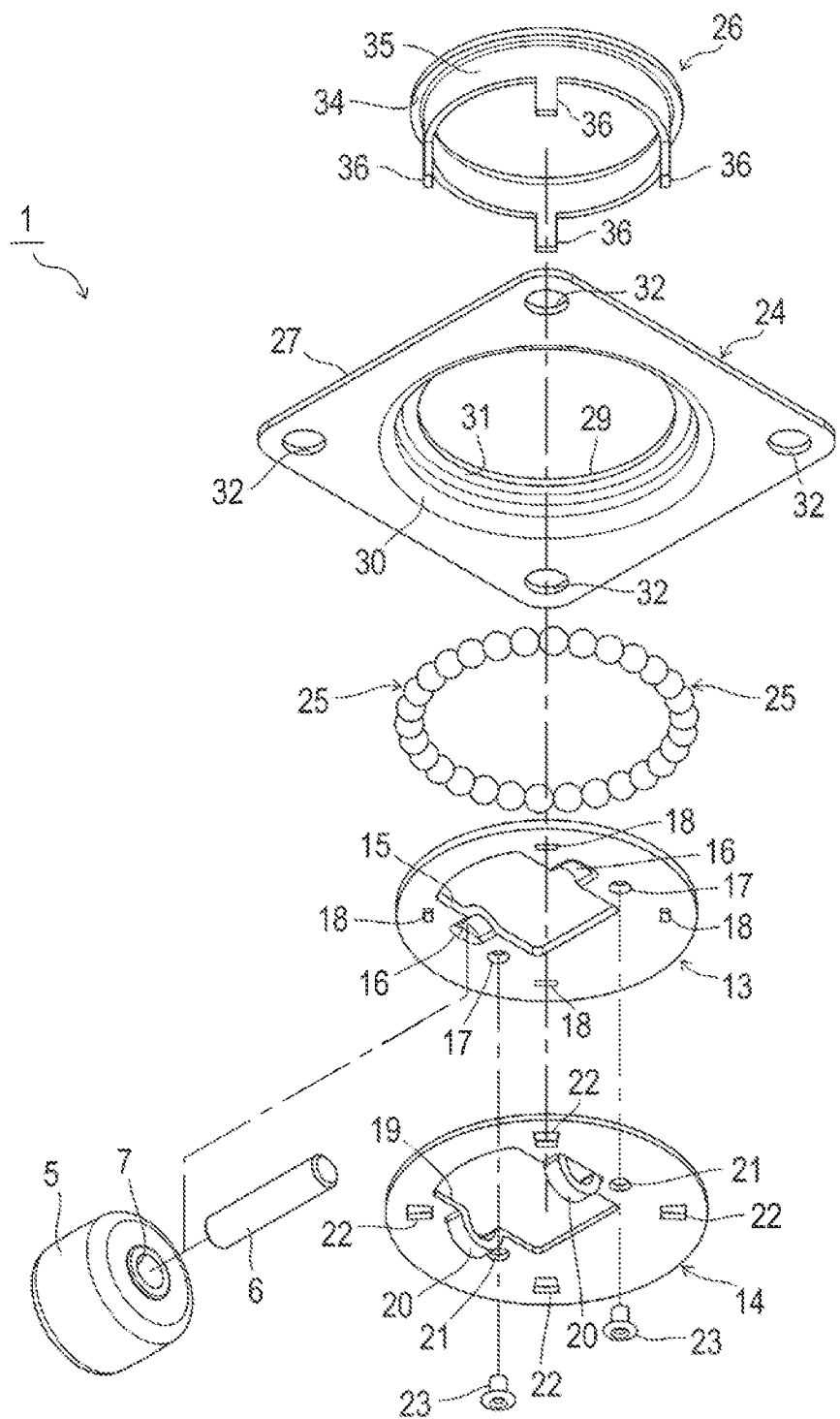

[FIG 9]
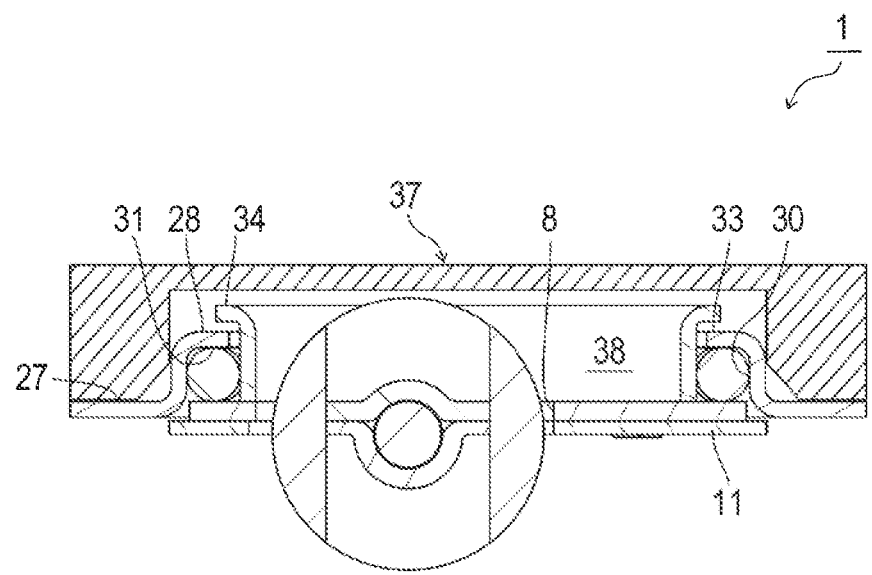
[FIG 10]
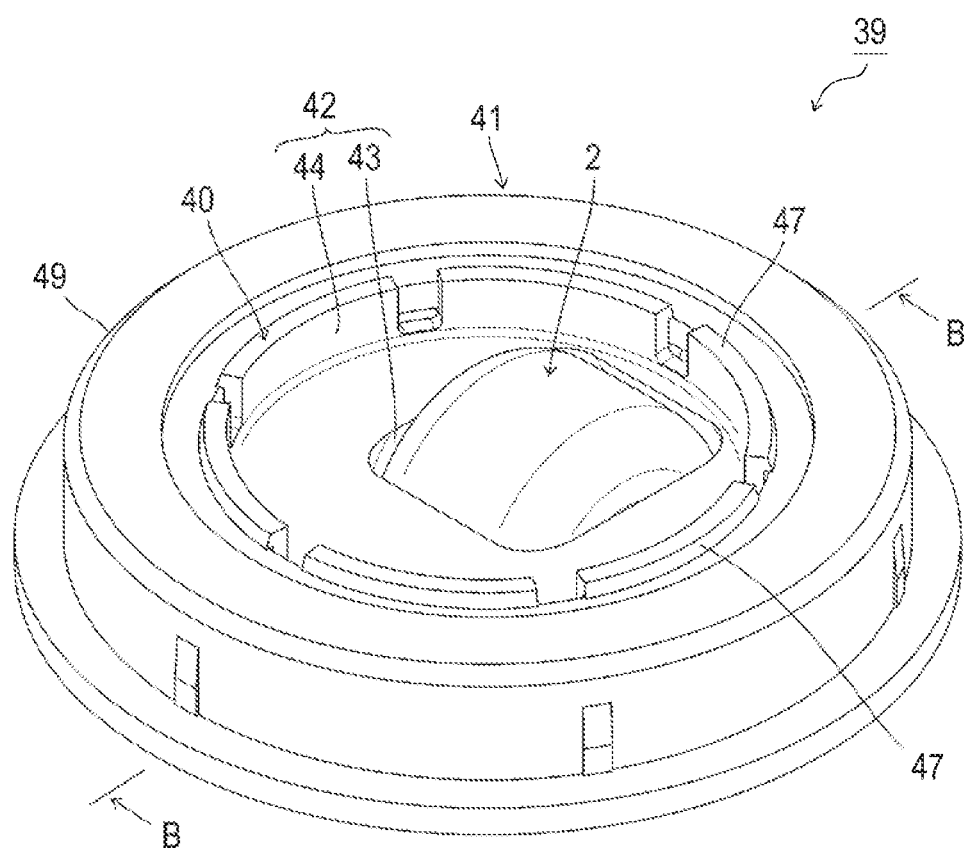

[FIG 11]
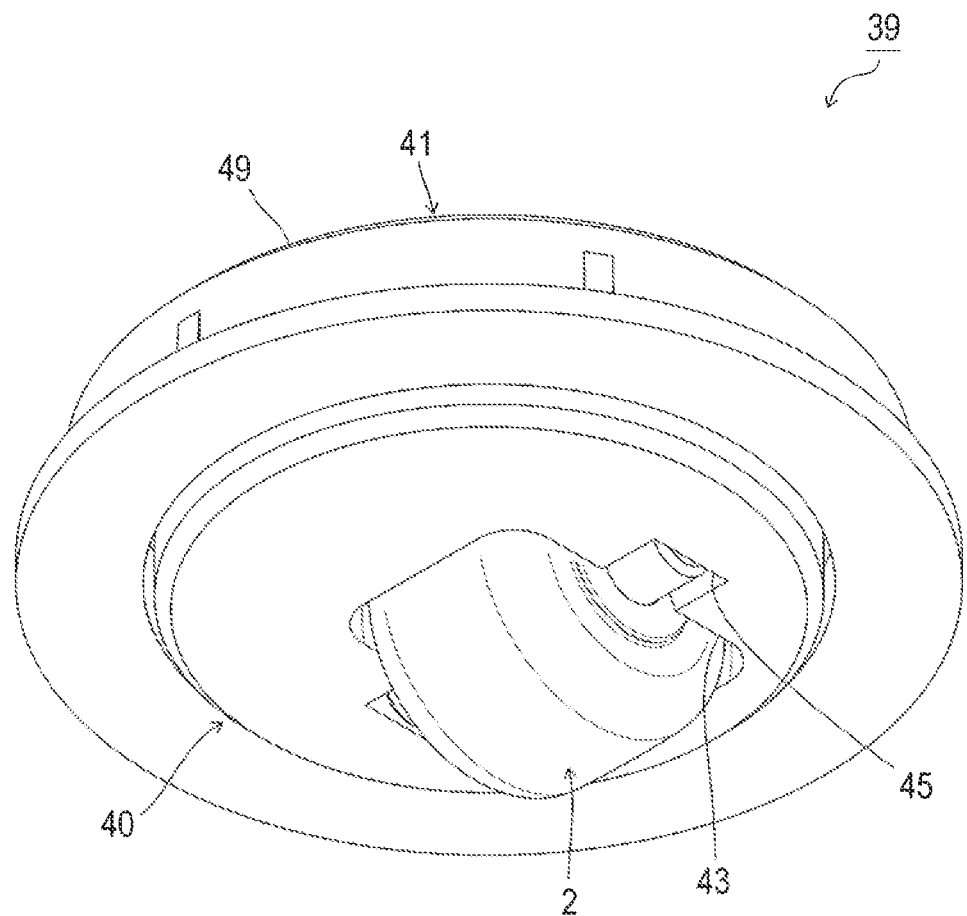
[FIG 12]
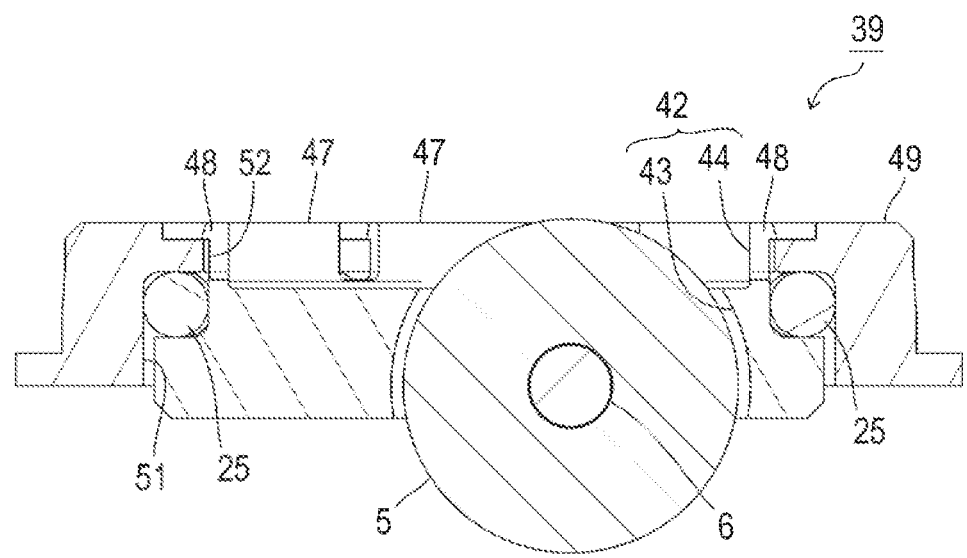
B-B

[FIG 13]
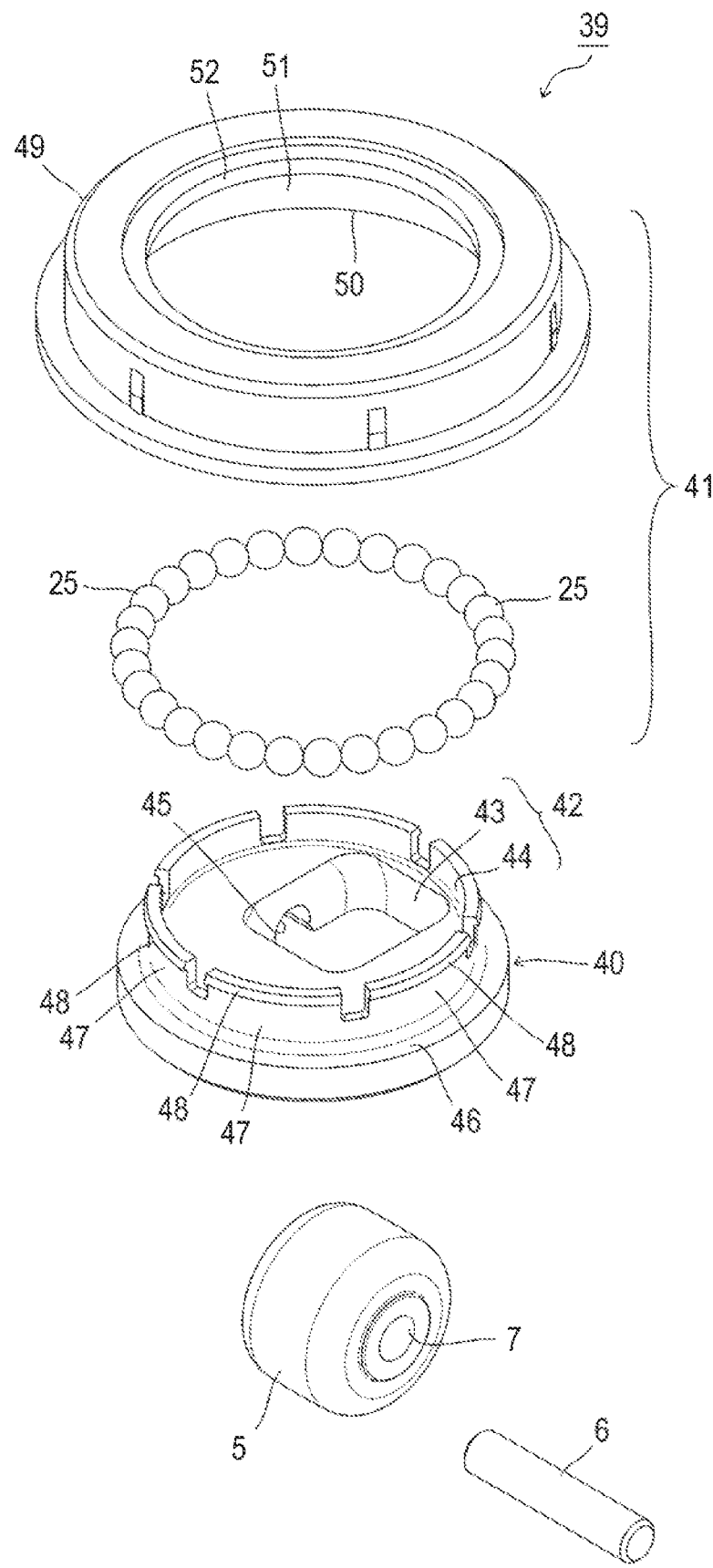

CASTER

TECHNICAL FIELD

The present invention relates to a caster to be attached to a mounting body that enables movement on a wheel.

BACKGROUND ART

If use of a TV stand that supports a TV or the like includes movement, there are cases in which a caster is attached to the TV stand or the like in order to enable movement on wheels. The caster described in Patent Document 1 is, for example, known as a caster that is attached to a mounting body such as a TV stand.

The caster described in the same patent document includes a main body case, a rotation case that is horizontally rotatably (swivelably) mounted on a lower surface of the main body case, and wheels that are rotatably attached to the rotation case.

Also, the main body case has a substantially cylindrical shape, an attachment flange having a square plate shape overall protrudes from the outer circumferential surface of the main body case, and a caster is attachable to a mounting member (mounting body) through attachment holes provided at protruding corners of the attachment flange. A partition wall is provided at an intermediate portion in a height direction inside the main body case, a cylindrical boss portion protrudes from the center of the partition wall, and an annular protrusion is provided on an outer circumferential surface of a leading end of the boss portion. The annular protrusion engages with a circumferential edge of a back surface of a mounting hole of a rotation case, which will be described later, and thus the rotation case is mounted on the lower surface of the main body case in a retained state such that the rotation case can rotate horizontally. An annular groove is formed on the outer periphery of the lower surface of the partition wall, and a plurality of balls are disposed in the annular groove to be movable in a circumferential direction.

Also, the rotation case has a thick disk shape, and a ball receiving groove is formed on an outer periphery of the upper surface of the rotation case. The ball receiving groove receives and supports the balls when the rotation case is mounted on the main body case. The mounting hole into which the boss portion of the main body case is inserted is formed at the center of the upper surface of the rotation case, and two clearance holes for preventing interference between two wheels, which will be described later, are respectively formed on both sides of the mounting hole. A bottom surface of the rotation case is provided with an attachment recess that is open on the lower surface side in a predetermined range in its circumferential direction, the attachment recess has two inner side surfaces that are parallel to each other, the two inner side surfaces are respectively provided with guide grooves extending along the horizontal direction, and shaft holes for attaching an wheel are formed through a circumferential wall of the rotation case respectively at predetermined positions of the guide grooves. Meanwhile, the wheel has a shape in which a center hole is formed at the center of the wheel, and cylindrical boss portions protrude from peripheral edges of the center hole. A pair of these wheels are coaxially disposed in the attachment recess of the rotation case, and the pair of wheels are rotatably attached via a shaft to the rotation case by bringing an outer surface of a boss portion of each wheel into contact with the two inner side surface of the rotation case and inserting the shaft into a shaft hole of the rotation case and the center hole of the wheel.

CITATION LIST

Patent Document

Patent Document 1: JP 2011-218141A

SUMMARY OF INVENTION

Technical Problem

In the caster described in Patent Document 1, in order to enable horizontal swiveling of the rotation case to which the wheels are attached, relative to the main body case, the mounting hole with which the annular protrusion of the main body case engages is formed in the upper surface of the rotation case located above the wheels, and the ball receiving groove that supports the plurality of balls disposed in the annular groove of the main body case is formed. Thus, because a swiveling mechanism is provided above the wheels, the caster has a high overall height.

Therefore, attachment of such casters to a mounting body such as a TV stand having a thin base installed on the floor for design-related reasons causes the problem of preventing the height of the base from being lowered and impeding the design of the mounting body.

The present invention has been made in view of the above-mentioned issues, and aims to provide a caster whose overall height can be reduced.

Solution to Problem

In order to resolve the above issues, a caster according to the present invention includes a wheel, a wheel support portion that is provided with a first opening where the wheel is disposed and rotatably supports the wheel, and a swivel mechanism portion that holds an outer peripheral portion of the first opening in the wheel support portion in a horizontally swivelable manner.

The swivel mechanism portion may include a plate whose lower surface has an annular recess, a plurality of rolling elements disposed in the recess, and a bracket attached to the plate in a horizontally swivelable manner together with the wheel support portion, and the outer peripheral portion may be held by the bracket and be in contact with the plurality of rolling elements from below.

In this case, the plate may be provided with a second opening inside the recess, and the bracket may include a locking portion that locks on a circumferential edge portion of the second opening on an upper surface of the plate and an engaging portion that extends downward from the locking portion, passes through the second opening, and engages with the outer peripheral portion. Furthermore, the plurality of rolling elements may be movable in a circumferential direction due to upward movement and outward movement of the plurality of rolling elements being restricted by the recess, downward movement of the plurality of rolling elements being restricted by the outer peripheral portion, and inward movement of the plurality of rolling elements being restricted by the engaging portion.

Also, the plate may include an attachment portion to be attached to a mounting body that enables movement on the wheel.

Advantageous Effects of Invention

According to the present invention, it is possible to reduce the overall height of a caster.

BRIEF DESCRIPTION OF DRAWINGS

FIG. 1 is a plan view showing a caster according to an embodiment of the invention.
FIG. 2 is a bottom view showing the caster of FIG. 1.
FIG. 3 is a front view showing the caster of FIG. 1.
FIG. 4 is a side view showing the caster of FIG. 1.
FIG. 5 is a cross-sectional view taken along line A-A in FIG. 1.
FIG. 6 is a perspective view of the caster of FIG. 1 seen from above.
FIG. 7 is a perspective view of the caster of FIG. 1 seen from below.
FIG. 8 is an exploded perspective view showing the caster of FIG. 1.
FIG. 9 is a diagram illustrating a state in which the caster of FIG. 1 is attached to a mounting body.
FIG. 10 is a perspective view of another caster according to an embodiment of the invention seen from above.
FIG. 11 is a perspective view of the caster of FIG. 10 seen from below.
FIG. 12 is a cross-sectional view taken along line B-B in FIG. 10.
FIG. 13 is an exploded perspective view showing the caster of FIG. 10.

DESCRIPTION OF EMBODIMENTS

An embodiment of the present invention will be described using the drawings.

FIGS. 1 to 8 show a caster according to this embodiment. A caster 1 includes a wheel 2, a wheel support portion 3, and a swivel mechanism portion 4.

The wheel 2 includes a wheel main body 5 and a round rod-shaped pin 6, a through hole 7 is provided at a rotation center of the wheel main body 5, and the pin 6 is inserted into the through hole 7 to protrude from both sides of the wheel main body 5.

The wheel support portion 3 is circular plate-shaped, and is provided with a substantially rectangular opening 8 where the wheel 2 is disposed. Pin support portions 9 and 9 that support the pin 6 are provided on the left and right sides of the opening 8, rivet holes 10 and 10 are provided behind the pin support portions 9 and 9, and four engagement holes 12 in total are provided in an outer peripheral portion 11 of the opening 8, in front of the pin support portions 9 and 9 and behind the rivet holes 10 and 10.

The wheel support portion 3 is formed by stacking the circular plate-shaped holder 13 and a cover 14 in the up-down direction, and the holder 13 has an opening 15 that forms the opening 8, semicircular portions 16 that form the pin support portions 9 and protrude upward, and round holes 17 that form the rivet holes 10, and rectangular holes 18 that form the engagement holes 12.

The cover 14 is provided with an opening 19 that forms the opening 8, semicircular portions 20 that form the pin support portions 9 and protrude downward, round holes 21 that form the rivet holes 10, and rectangular holes 22 that form the engagement holes 12.

As a result of the holder 13 and the cover 14 being fastened by the rivets 23 inserted into the rivet holes 10 in a state in which the semicircular portions 16 and the semicircular portions 20 hold the pin 6 of the wheel 2 from above and below, the wheel 2 is rotatably supported by the wheel support portion 3.

The swivel mechanism portion 4 includes a plate-shaped case 24, balls 25, and a sleeve 26.

The case 24 includes a rectangular plate-shaped attaching seat 27, an annular step portion 28 formed on a lower surface of the attaching seat 27 in a recessed shape, and a circular opening 29 formed inside the step portion 28. Here, the step portion 28 protrudes upward from the upper surface of the attaching seat 27, and includes a circumferential wall portion 30 extending upward from the attaching seat 27 and an upper wall portion 31 extending inward (toward the circular opening 29) from an upper portion of the circumferential wall portion 30. A plurality of balls 25 are disposed over the entire circumference of the step portion 28 in contact with the circumferential wall portion 30 and the upper wall portion 31.

Note that attachment portions 32, which are to be attached to a mounting body such as a TV stand using screws or the like, are provided at four corners of the attaching seat 27.

The sleeve 26 includes a locking portion 34 that locks on a circumferential edge portion 33 of the circular opening 29 (an upper portion of the step portion 28) on the upper surface of the case 24, a cylindrical portion 35 that extends downward from the locking portion 34 and passes through the circular opening 29, and four engagement claws 36 that extend downward from the cylindrical portion 35 and respectively engage with four engagement holes 12.

When the engagement claws 36 engage with the engagement holes 12, the outer peripheral portion 11 of the wheel support portion 3 is held by the sleeve 26, and is in contact with the balls 25 from below. At this time, the cylindrical portion 35 of the sleeve 26 is in contact with the balls 25 on the inner side, upward movement of the balls 25 is restricted by the step portion 28 (the upper wall portion 31) of the case 24, outward movement of the balls 25 is restricted by the step portion 28 (the circumferential wall portion 30), downward movement of the balls 25 is restricted by the outer peripheral portion 11 of the wheel support portion 3, and inward movement of the balls 25 is restricted by the cylindrical portion 35 of the sleeve 26. Thus, the balls 25 can move in the circumferential direction and a ball bearing is formed. The sleeve 26 is attached to the case 24 in a horizontally swivelable manner together with the wheel support portion 3, and the swivel mechanism portion 4 holds the outer peripheral portion 11 of the wheel support portion 3 in a horizontally swivelable manner.

The caster 1 according to this embodiment includes the wheel 2, the wheel support portion 3 that is provided with the opening 8 where the wheel 2 is disposed and rotatably supports the wheel 2, and the swivel mechanism portion 4 that holds the outer peripheral portion 11 of the opening 8 in the wheel support portion 3 in a horizontally swivelable manner. Therefore, the overall height of the caster 1 can be reduced because the swivel mechanism portion 4 is located at a height comparable to the outer peripheral portion 11 of the opening 8 where the wheel 2 is disposed.

In this embodiment, the swivel mechanism portion 4 includes the case 24 whose lower surface has the annular step portion 28, the plurality of balls 25 disposed on the step portion 28, and the sleeve 26 attached to the case 24 in a horizontally swivelable manner together with the wheel support portion 3. The outer peripheral portion 11 of the wheel support portion 3 is held by the sleeve 26 and is in contact with the plurality of balls 25 from below, and thus, the swivel mechanism portion 4 is located at a height comparable to the outer peripheral portion 11. As shown in FIGS. 3 and 4, the upper portion of the swivel mechanism portion 4 is lower than the upper portion of the wheel 2, and the overall height of the caster 1 is equal to the overall height of the wheel 2 (when the caster 1 is attached to the mounting body 37 as shown in FIG. 9, a space 38 for allowing rotation of the wheel 2 need to be secured below the mounting body 37).

Also, the case 24 is provided with the circular opening 29 inside the step portion 28, the sleeve 26 includes the locking portion 34 that locks on the circumferential edge portion 33 of the circular opening 29 on the upper surface of the case 24, the cylindrical portion 35 and the engagement claws 36 that extend downward from the locking portion 34, pass through the circular opening 29, and engage with the outer peripheral portion 11. Upward movement and outward movement of the balls 25 are restricted by the step portion 28, downward movement of the balls 25 is restricted by the outer peripheral portion 11, and inward movement of the balls 25 is restricted by the cylindrical portion 35. Thus, the balls 25 can move in the circumferential direction and a ball bearing can be easily formed, thus reducing the number of components and making it possible to reduce costs and facilitate maintenance.

Although the embodiment of the present invention has been described above, the embodiment of the present invention is not limited to that described above, and may be, for example, modified as appropriate without departing from the spirit of the invention.

The wheel support portion may be held by the swivel mechanism portion in any configuration as long as the outer peripheral portion can be held swivelably, for example, and the overall height of the caster may exceed the overall height of the wheel.

Also, as shown in FIGS. 10 to 13, the wheel support portion need not be plate-shaped.

In FIGS. 10 to 13, a caster 39 includes a wheel 2, a wheel support portion 40, and a swivel mechanism portion 41.

The wheel 2 includes a wheel main body 5 and a round rod-shaped pin 6, a through hole 7 is provided at a rotation center of the wheel main body 5, and the pin 6 is inserted into the through hole 7 to protrude from both sides of the wheel main body 5.

The wheel support portion 40 has a circular block shape in a plan view and is thicker than the wheel support portion 3 of the caster 1, and is provided with an opening 42 where the wheel 2 is disposed. The opening 42 includes an opening 43 extending along the shape of the wheel main body 5, and a circular opening 44 that is in communication with the opening 43 above the opening 43 and is larger than the opening 43 in a plan view.

Pin support portions 45 and 45 that support the pin 6 are provided on the left and right sides of the opening 43, and the wheel 2 is rotatably supported by the wheel support portion 40.

A step portion 46 having an L-shaped cross section is formed over the entire circumferential surface of the wheel support portion 40, and a plurality of circumferential wall portions 47 surrounding the opening 44 are formed above the step portion 46. Locking portions 48 that protrude outward are provided on upper portions of the circumferential wall portions 47.

The swivel mechanism portion 41 includes balls 25 and a sleeve 49, and the sleeve 49 is provided with an opening 50 that is circular in a plan view, and a flange portion 52 that protrudes inward from a circumferential surface 51 surrounding the opening 50.

The wheel support portion 40 is disposed in the opening 50 such that the balls 25 are located on the step portion 46 (such that the step portion 46 is in contact with the balls 25 from inside and below), and the locking portions 48 lock on the upper surface of the flange portion 52 (when the locking portions 48 pass through the flange portion 52 from below to above, the circumferential wall portion 47 elastically deforms and bends, and after the locking portions 48 pass therethrough, the elastically deformed circumferential wall portion 47 returns to its original state, and the locking portions 48 lock on the flange portion 52). As a result, upward movement of the balls 25 is restricted by a lower surface of the flange portion 52, and outward movement of the balls 25 is restricted by a circumferential surface 51. Therefore, a ball bearing is formed, and the swivel mechanism portion 41 holds the outer peripheral portion (circumferential wall portion 47) of the opening 42 of the wheel support portion 40 in a horizontally swivelable manner.

The caster 39 also includes the wheel 2, the wheel support portion 40 that is provided with the opening 42 where the wheel 2 is disposed and rotatably supports the wheel 2, and the swivel mechanism portion 41 that holds the outer peripheral portion of the opening 42 in the wheel support portion 40 in a horizontally swivelable manner. Therefore, the overall height of the caster 39 can be reduced because the swivel mechanism portion 41 is located at a height comparable to the outer peripheral portion of the opening 42 where the wheel 2 is disposed.

LIST OF REFERENCE NUMERALS

1 Caster
2 Wheel
3 Wheel support portion
4 Swivel mechanism portion
8 Opening (first opening)
11 Outer peripheral portion
24 Case (plate)
25 Ball (rolling element)
26 Sleeve (bracket)
28 Step portion (recess)
29 Circular opening (second opening)
34 Locking portion
35 Cylindrical portion (engaging portion)
36 Engagement claw (engaging portion)
39 Caster
40 Wheel support portion
41 Swivel mechanism portion
42 Opening (first opening)

The invention claimed is:

1. A caster comprising:
a wheel;
a wheel support portion that is provided with a first opening where the wheel is disposed and rotatably supports the wheel; and
a swivel mechanism portion that holds an outer peripheral portion of the first opening in the wheel support portion in a horizontally swivelable manner;
wherein the swivel mechanism portion includes
a plate whose lower surface has an annular recess,
a plurality of rolling elements disposed in the recess, and
a bracket attached to the plate in a horizontally swivelable manner together with the wheel support portion, and the outer peripheral portion is held by the bracket and is in contact with the plurality of rolling elements from below.

2. The caster according to claim 1, wherein the plate includes an attachment portion to be attached to a mounting body that enables movement on the wheel.

3. The caster according to claim 1, wherein the plate is provided with a second opening inside the recess, and the bracket includes
- a locking portion that locks on a circumferential edge portion of the second opening on an upper surface of the plate, and
- an engaging portion that extends downward from the locking portion, passes through the second opening, and engages with the outer peripheral portion.

4. The caster according to claim 3, wherein the plurality of rolling elements are movable in a circumferential direction due to upward movement and outward movement of the plurality of rolling elements being restricted by the recess, downward movement of the plurality of rolling elements being restricted by the outer peripheral portion, and inward movement of the plurality of rolling elements being restricted by the engaging portion.

5. The caster according to claim 3, wherein the plate includes the attachment portion to be attached to the mounting body that enables movement on the wheel.

6. The caster according to claim 4, wherein the plate includes the attachment portion to be attached to the mounting body that enables movement on the wheel.

* * * * *